March 27, 1956  J. DOLZA ET AL  2,739,835
THERMOSTAT
Filed Oct. 14, 1950  4 Sheets-Sheet 1
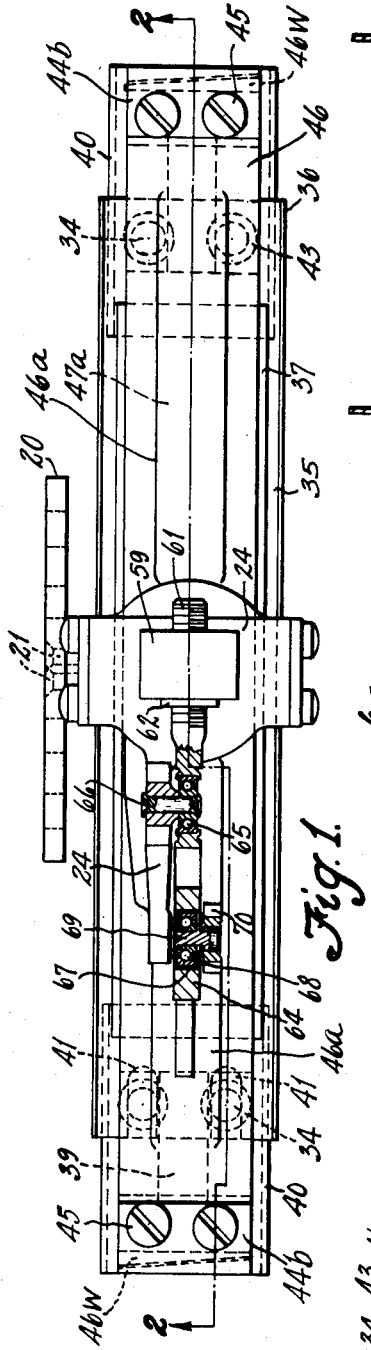
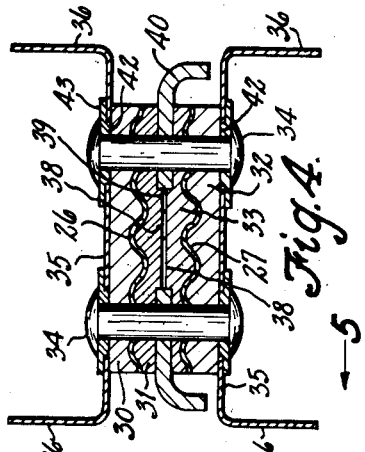
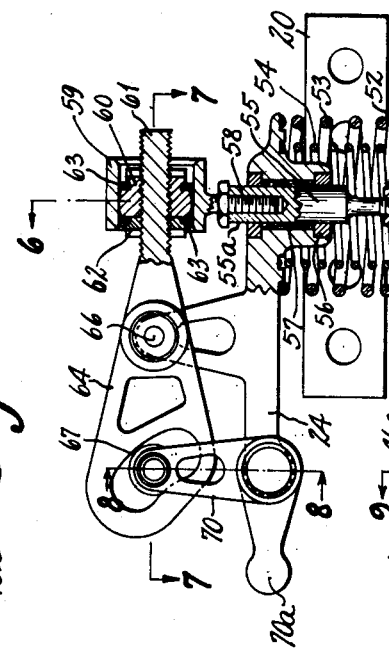
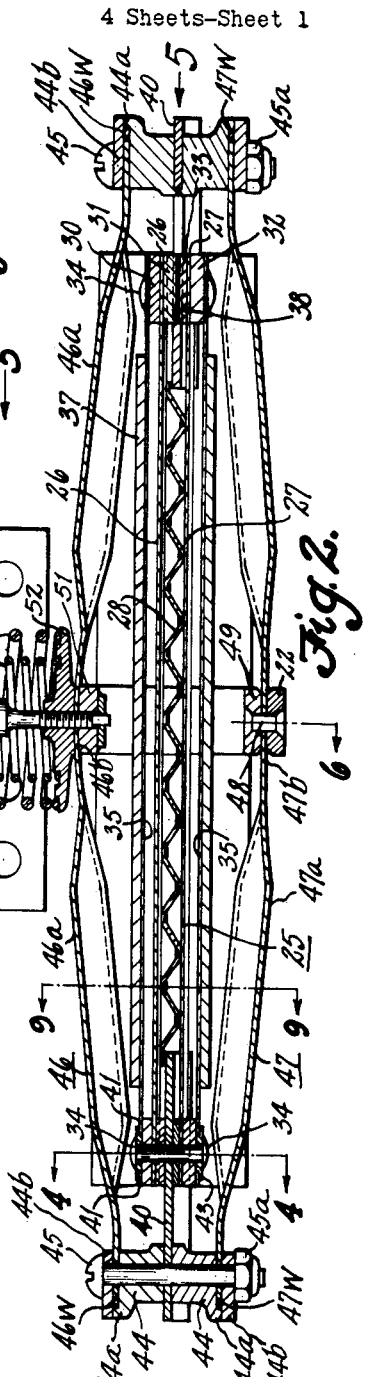
INVENTORS
John Dolza
William K. Steinhagen
by Willits Hardman & Fehr
their ATTORNEYS INVENTORS
John Dolza
William K. Steinhagen
by Willits Hardman & Fehr
their ATTORNEYS

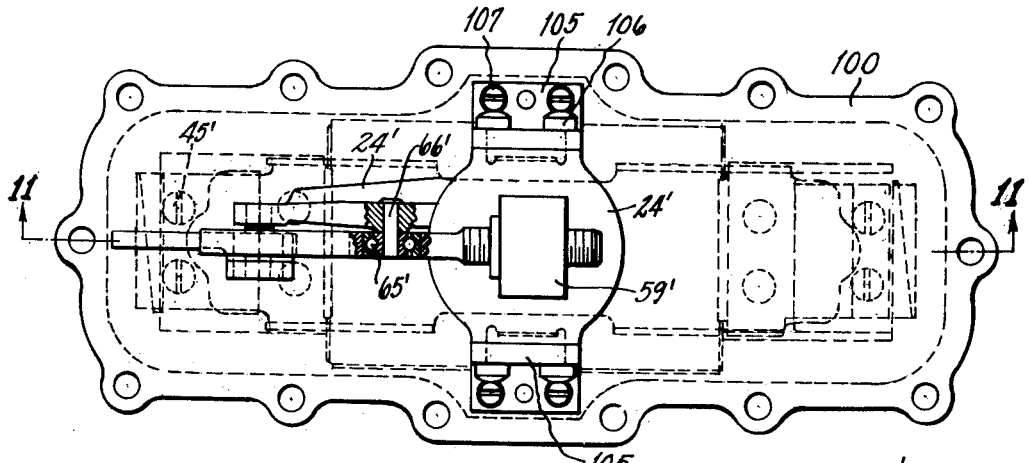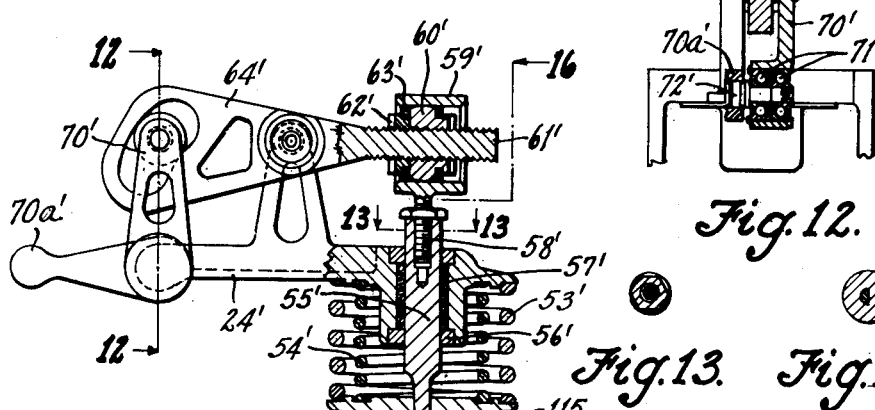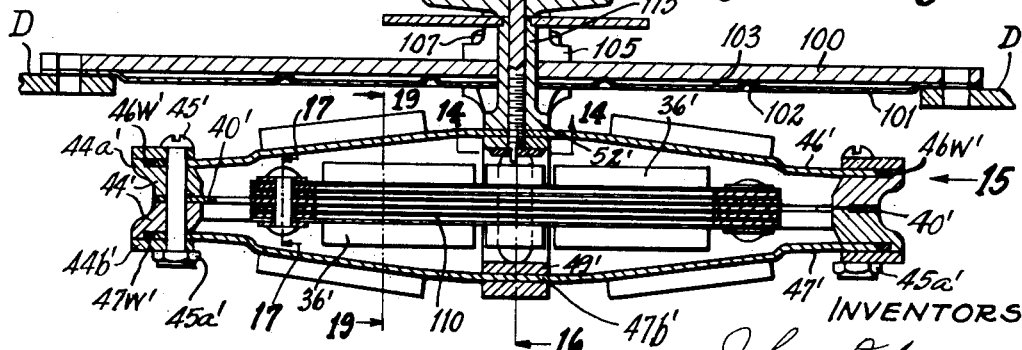

March 27, 1956 J. DOLZA ET AL 2,739,835
THERMOSTAT
Filed Oct. 14, 1950 4 Sheets-Sheet 4

INVENTORS
John Dolza
William K. Steinhagen
by Willits Hardman & Fehr
their ATTORNEYS

United States Patent Office 2,739,835
Patented Mar. 27, 1956

2,739,835

THERMOSTAT

John Dolza, Fenton, and William K. Steinhagen, Royal Oak, Mich., assignors to General Motors Corporation, Detroit, Mich., a corporation of Delaware Application October 14, 1950, Serial No. 190,086

4 Claims. (Cl. 297—12)

This invention relates to a temperature sensing device and more particularly one adapted to sense changes in temperature of a gaseous medium, such as air, moving at a relatively high speed.

An object of the invention is to provide a device which will quickly sense relatively small changes in temperature of a gaseous medium and impart movement corresponding to temperature change to apparatus which requires control in accordance with the temperature of the medium. In the disclosed embodiment of the invention, this object is accomplished by a structure which comprises a strut, the ends of which are connected with two arched frames, the central portions of which are spaced further from the strut than the ends of the frames are spaced from the strut, a fixed mounting bracket to which the central portion of one of the frames is attached, a movable member supported by the bracket and operatively connected with the central portion of the other frame whereby the member is actuated in response to change of temperature of the environs of the strut, and spring means for maintaining the strut under tension. The frames are made of metal of relatively low thermal coefficient of expansion, such as Invar. The struts include intermediate elements of metal having relatively high tensile strength, modulus of elasticity and thermal coefficient of expansion, such as a manganese alloy and two end portions of material, such as Kovar, having length and thermal coefficient of expansion such that change of length of the frames is compensated for by change of length of these end portions which are called compensators. The central portion of one of the frames is fixed and the central portion of the other frame is connected with a movable member which is connectible with apparatus to be controlled. Due to expansion or contraction of the strut with increase or decrease in temperature of the medium which surrounds it, the movable central portion of one frame approaches or recedes from the fixed central portion of the other frame by an amount which is several times the amount of increase or decrease in strut length. To obtain sensitiveness, the strut intermediate elements comprises relatively thin, parallel strips of metal which are longitudinally corrugated to increase rigidity and to increase turbulence of the rapidly moving gaseous medium which flows over them transversely of their corrugations.

Further objects and advantages of the present invention will be apparent from the following description, reference being had to the accompanying drawings, whereing preferred embodiments of the present invention are clearly shown.

In the drawings:

Fig. 1 is a plan view of a thermostat embodying the invention.

Fig. 2 is a sectional view on line 2—2 of Fig. 1.

Fig. 3 is an enlargement of a portion of Fig. 2.

Fig. 4 is an enlarged sectional view on line 4—4 of Fig. 2.

Figs. 6, 7, 8 and 9 are, respectively, sectional views on lines 6—6, 7—7, 8—8 and 9—9 of Fig. 2.

Fig. 10 is a plan view of a modified form of thermostat embodying the invention.

Figs. 11, 12, 13 and 14 are sectional views, respectively, on lines 11—11, 12—12, 13—13 and 14—14 of Figs. 10 and 11.

Figure 15:
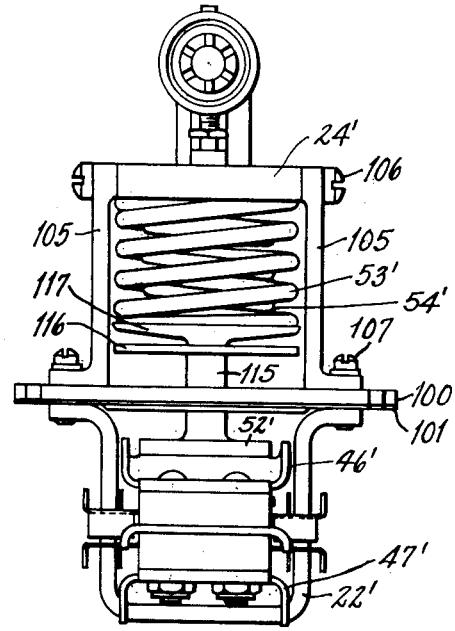

Fig. 15 is a view in the direction of arrow 15 of Fig. 11.

Figure 16:
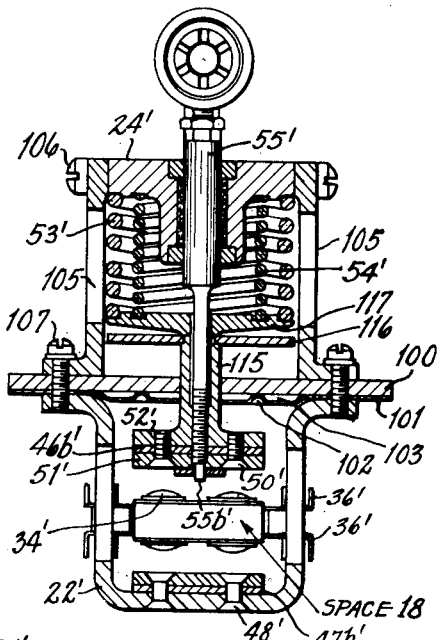

Fig. 16 is a sectional view on line 16—16 of Fig. 11.

Figure 17:
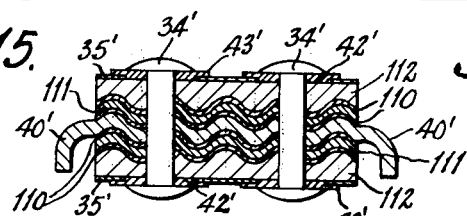

Fig. 17 is an enlarged, sectional view on line 17—17 of Fig. 11.

Figure 18:
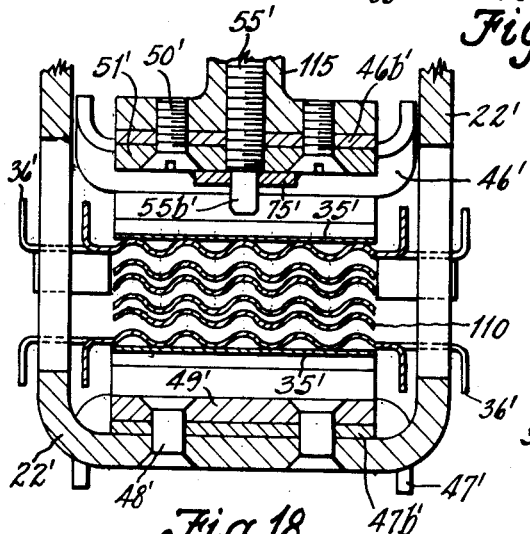

Fig. 18 is an enlargement of that portion of Fig. 16 which is space 18 of Fig. 11.

Figure 19:
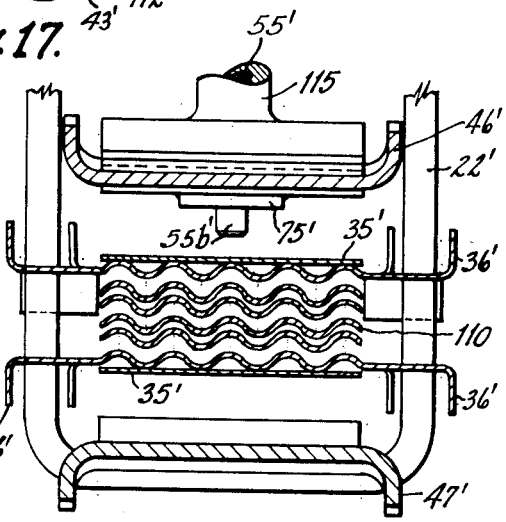

Fig. 19 is an enlarged sectional view on line 19—19 of Fig. 11.

Figure 5:
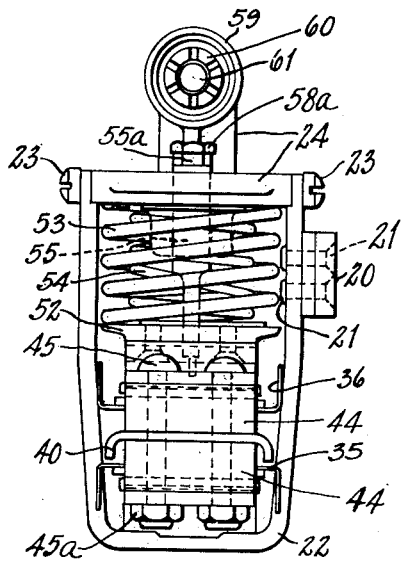
Fig. 5 is a view in the direction of arrow 5 of Fig. 2.
Figure 6:
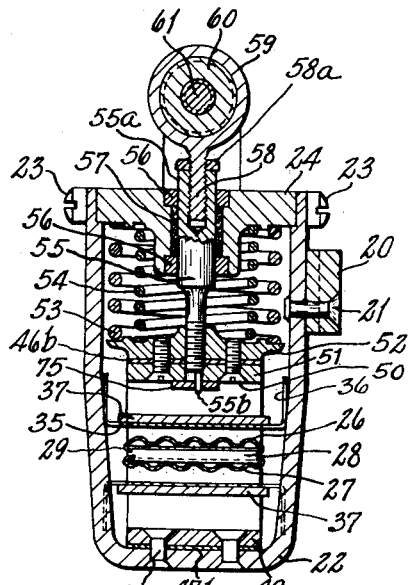
Figure 7:
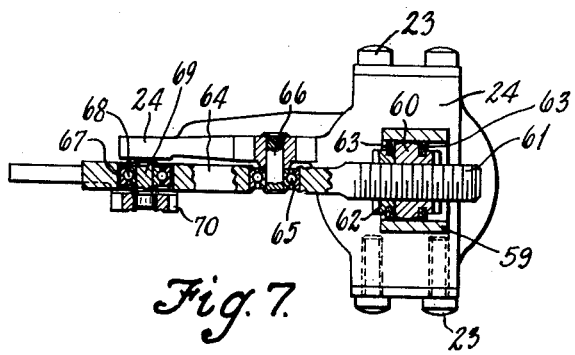
Figure 8:
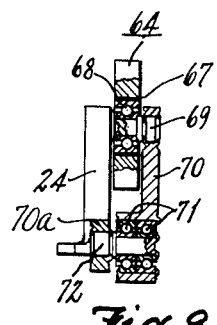
Figure 9:
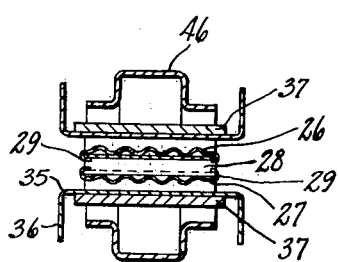

Referring to Figs. 1 and 2, a bracket 20, which is adapted to support the thermostat in a duct containing the gaseous medium, is attached by rivets 21 to a stirrup 22 which screws 23 attach to a frame 24. Stirrup 22 supports a structure having a strut which includes an assembly 25 which comprises two thin, corrugated strips 26 and 27 of manganese alloy of relatively high thermal coefficient of expansion, tensile strength and modulus of elasticity. The strips are spaced by a corrugated brace 28 of the same metal and attached to the strips as shown in Fig. 6 by bending tangs 29 of these strips around and against those portions of the brace 28 which contact the strips. Some of the tangs 29 are soldered with a soft solder to the strips 26 and 27 (Fig. 6). The ends of the strip 26 are silver brazed to clamp blocks 30 and 31; and the ends of the strip 27 are silver brazed to clamp blocks 32 and 33. Rivets 34 pass through the stacks of parts including the strips and clamp blocks and also through the webs 35 of channel shaped deflector strips 36 to the webs of which plates 37 of aluminum or similar metal are attached. Each of the clamp blocks 31, 33 has a rectangular boss 38 received by a rectangular hole 39 in a compensator plate 40 of metal, such as Kovar, having length and thermal coefficient of expansion such as to provide a compensating effect that will be described later. The webs 35 of deflectors 36 have, at their right ends, holes through which rivets 34 pass and have, at their left ends, slots 41 (Fig. 3) which receive the portions 42 of smaller diameter of washers 43 through which rivets 34 pass. Therefore expansion and contraction of the deflectors 36 has no effect. The function of the deflectors is to obstruct the flow of the medium to the frames and to confine flow to the region of the strips 26 and 27 as the medium flows through a slit aligned with the strips into the duct which encloses the thermostat. The strips are longitudinally corrugated not only to increase their rigidity to assist in prevention of vibration as rapidly moving gaseous medium passes over them but also to increase turbulence of the medium for the purpose of increasing the ability of the strips to respond quickly to temperature change of the medium. It will be observed in Fig. 6 that the corrugations are substantially parallel as viewed in cross section so that the medium passing between them transversely of their longer dimension will be required to take a sinuous path.

The plates 40 are secured between blocks 44 by screws 45 and nuts 45a which pass through holes in the plates and blocks and in the ends of frames 46 and 47 of Invar metal and in clamping plates 44b. Blocks 44 have flanges 44a adjacent the ends of frames 46 and 47. Wedges 46w, and 47w, respectively, are driven between flanges 44a and the ends of frames 46 and 47 to take up clearance. Arched frames 46 and 47 of metal, such as Invar, having high strength and low thermal coefficient of expansion, include parts 46a and 47a of channel shaped cross section and flat central portions 46b and 47b, respectively. Bending of frames 46 and 47 is confined to the junction of their channel portion with their flat portion.

Junction 47b of frame 47 is attached to stirrup 22 by rivets 48 and plate 49. Screws 50 and plate 51 clamp junction 46b against a spring seat 52 supporting springs 53 and 54 of metal of very low thermoelastic coefficient (for example, practically zero coefficient between −65° and 200° F.), said springs being under compression between seat 52 and frame 24. A rod 55 is threaded through seat 52 and extends through bearing discs 56 and a fiber sleeve 57 and threadedly receives a stem 58 of a tubular socket 59 receiving a nut 60 threaded on a screw 61 and having a spherical surface engaging the inner cylindrical surface of the socket 59 and locked in adjusted position on rod 61 by a washer 62. Felt washers 63 keep dirt particles from entering between nut 60 and socket 59. Screw 61 is part of a lever 64 journaled on a ball bearing 65 supported by a rivet 66 attached to frame 24. Lever 64 provides a cam 67 which receives the outer race of a ball bearing 68 fixed to a stud 69 fixed to a lever 70 having an arm 70a and journaled on ball bearings 71 fixed to a stud 72 fixed to frame 24. Cam 67 is contoured to cause movement of lever 70 in some definite relation to movement of rod 55 which has a position relative to frame 24 which depends on total temperature (° R.) of the strips 26 and 27.

For a certain total temperature of the strips 26 and 27, a certain position of lever 64 is required. An adjustment is provided by making the threads of stem 58 right hand and the threads on the lower end of rod 55 left hand. To make an adjustment in effective rod length, rod 55 is turned by applying a wrench to the hex-portion 55a and the adjustment is fixed by tightening lock nut 58a and by welding to plate 51 a disc 75 having a half-round hole which receives the half-round extension 55b of rod 55. Thus the position of lever 64 in relation to spring seat 52 is initially fixed.

To adjust the lever arm of rod 55 with respect to fulcrum 66 of lever 64, the nut 60 is adjusted on the screw 61.

Springs 53 and 54 urge portion 46b of frame 46 toward portion 47b of frame 47, thus tending to straighten frames 46 and 47. Tendency to straighten applies force from the ends of the frames 46 and 47 through wedges 46w and 47w to flanges 44a of blocks 44 which cause application of force from flanges 44a of blocks 44 to the compensators 40. The compensators 40 transmit force to clamps 31 and 33 attached to strips 26 and 27. Therefore there is no lost motion between the strips 26 and 27 and the rod 55.

Temperature increase causes expansion of strips 26 and 27 and hence the distance between right blocks 44 and left blocks 44; and the springs 53 and 54 are permitted to expand to urge the frames 46 and 47 into more nearly straight condition and the junction 46b toward the junction 47b; and a certain rotary movement of lever 70 in one direction is the result. Temperature decrease causes contraction of the strips 26 and 27 which pull the compensators 40 and the ends of frames 46 and 47 toward one another to increase the distance between portions 46b and 47b against the action of the springs 53 and 54 which continually operate to take up lost motion. This results in rotation of the lever 70 in the other direction.

It is necessary that the displacement of lever 70 take place in response only to change of temperature of strips 26 and 27. If the frames 46 and 47 had zero thermal coefficient of expansion over the entire range of temperature to which the thermostat is subjected, the change in distance between frame portions would be due entirely to change in the length of strips 26 and 27. Since the frames have a thermal coefficient of expansion greater than zero and since the rate of temperature change in the frames is less than the rate of temperature change in the strips, it is necessary to offset change in length of the frames by an equal and opposite amount. This offset is effected by the compensators 40 which have length and thermal coefficient of expansion such that they elongate or shorten at the same rate that the frames 46 and 47 elongate or shorten as temperature increases or decreases. Therefore the operation of the thermostat is the same as it would be if the strips 26 and 27 were directly attached to frames having zero coefficient of thermal expansion. Other parts are made of metal having relatively small temperature coefficient, so that temperature change in these parts does not materially affect the relation between the distance between portions 46b and 47b and the position of lever 70.

The form of thermostat shown in Figs. 10–19 is adapted for sensing temperatures in a higher range. The parts of this form which have functions corresponding to the functions of parts of the first form are indicated by the reference numbers of corresponding parts of the first form with primes affixed. In the second form, the part which supports the thermostat is a cover plate 100 used to close an opening in the side of a duct D which conveys the gaseous medium whose temperature is to be sensed. The cover gasket 101 has bosses 102 to provide a dead air space 103 adjacent the cover 100. Frame 24' is supported above cover 100 by brackets 105 attached to frame 24' by screws 106 and attached by screws 107 to cover 100 and stirrup 22'.

The strut of the second thermostat includes four corrugated manganese alloy strips 110, the ends of which are each silver brazed to two spacers 111 and two clamp blocks 112 and to a compensator 40' as shown in Fig. 17. The parts 111 and 112 are made of manganese alloy. Rivets 34' and washers 43' secure to this assembly shield supports 35' each spot welded to a shield 36' (Fig. 19). Supports 35' each have at one end a slot to receive the boss of a washer 43' (Fig. 17) in the manner similar to that shown in Fig. 3.

The part 52' (Fig. 16) corresponding to part 52 (Fig. 6), does not directly support springs 53' and 54'. Part 52' has a stem 115 which extends through cover 100 and gasket 101 and which receives the threaded lower end of rod 55' and which supports a disc 116 which supports a disc 117 which supports the springs 53' and 54'. This construction is desirable in order to thermally isolate the springs 53' and 54' from the cover 100 as much as possible.

A feature of both thermostats is the use of thin, corrugated strips of metal having relatively high temperature coefficient of expansion. These strips acquire the heat of the surrounding medium quicker than if they were flat. The passage of air at relatively high speed tends to cause the corrugated strips to flutter. In the first thermostat, shown in Figs. 1 to 9, the strips 26 and 27 are relatively long since the range of temperature of the air to which they are exposed is relatively small for example, 100° to 150° F. Therefore, the diagonal brace 28 (Fig. 2) is used. Because the second thermostat, shown in Figs. 10 to 19, is used in a range of temperatures higher than that in which the first thermostat is used, the strips 110 are shorter than strips 26 and 27; and, consequently, they do not flutter to such extent as to require bracing. The frames 46' and 47' of the second thermostat are made of thicker material than frames 46 and 47 of the first thermostat. Hence, four strips 110 are used because more force is required to bend frames 46' and 47' than to bend the thinner frames 46 and 47 of the first thermostat. Referring to Figs. 18 and 19, it will be observed that the corrugations of the deflectors 36' and of the strips 110 are parallel as viewed in cross sectional assembly so that the gaseous medium which flows over them transversely of their corrugations is required to take a sinuous path, thereby increasing turbulence of the medium and hence the ability of the strips to respond quickly to change in temperature of the medium.

The cam 67 (Fig. 2) may be contoured to suit the requirements of the apparatus which is dependent upon the temperature signal produced by the thermostat. For example, if the apparatus is one which operates in accordance with a logrithm of temperature of a certain medium, lever 70 may be caused by the cam 67 to convert the temperature reading into $$\frac{\log \theta}{4}$$

where $\theta$ equals $$\frac{\text{total temperature of the gaseous medium } °R}{518.4}$$

The silver brazing of the strips 26 and 27 of manganese alloy to the clamp blocks 30, 31 and 32, 33 respectively should be done at as low a temperature as possible in order to prevent damage to the strips. It is desirable to use a low-melting point silver-solder. The areas of the strips which are to be silver-brazed are copper plated to prevent, during brazing, the diffusion of the manganese with the silver which, if permitted, would form a silver-manganese alloy having a melting point much higher than desirable for the brazing operation. When the strips are brazed to the clamp blocks, the strips are annealed in a hydrogen atmosphere at 1300° F. for four minutes, and are cooled to 500° F. in the annealing furnace. Then they are aged at 700° F. in a neutral atmosphere for 10 hours. This treatment improves the stability of the strips so that, over a substantial period of time, they will produce an accurate indication of temperatures at least as high as 700° F. If the strips are not stabilized, they "creep," that is, their length at a given temperature does not remain the same.

While the embodiments of the present invention as herein disclosed, constitute preferred forms, it is to be understood that other forms might be adopted.

What is claimed is as follows:

1. A thermostat comprising a strut including elements of material having relatively high temperature coefficient of expansion, two arched frames of material having relatively low temperature coefficient of expansion located on opposite sides of the strut, means for attaching the ends of the frames to the ends of the strut, the central portions of the frames being more remotely spaced from the strut than their end portions, a fixed mounting bracket to which the central portion of one of the frames is attached, a movable member adapted to effect movements of a control device in accordance with changes in temperature and supported by the bracket, an operating member operatively connecting said movable member with the central portion of the other frame whereby said member is actuated in response to change of temperature of the environs of the strut, spring means exerting pressure on one of said frames for maintaining the strut under tension, said strut including two compensators between which the strut elements of relatively high temperature coefficient of expansion are located and with which the ends of said elements are operatively connected, and said compensators having length and temperature coefficient of expansion such as to compensate for variation in length of the frames with change of temperature thereof.

2. A thermostat comprising a strut including elements of material having relatively high temperature coefficient of expansion, two arched frames of material having relatively low temperature coefficient of expansion located on opposite sides of the strut, means for attaching the ends of the frames to the ends of the strut, the central portions of the frames being more remotely spaced from the strut than their end portions, a fixed mounting bracket to which the central portion of one of the frames is attached, a movable member adapted to effect movements of a control device in accordance with changes in temperature and supported by the bracket, an operating member operatively connecting said movable member with the central portion of the other frame whereby said member is actuated in response to change of temperature of the environs of the strut, spring means exerting pressure on one of said frames for maintaining the strut under tension, said strut comprising a plurality of relatively thin, longitudinally corrugated, parallel strips of material having a relatively high temperature coefficient of expansion and a transversely corrugated spacer strip between the longitudinally corrugated strips.

3. A thermostat comprising a strut including elements of material having relatively high temperature coefficient of expansion, two arched frames of material having relatively low temperature coefficient of expansion located on opposite sides of the strut, means for attaching the ends of the frames to the ends of the strut, the central portions of the frames being more remotely spaced from the strut than their end portions, a fixed mounting bracket to which the central portion of one of the frames is attached, a movable member adapted to effect movements of a control device in accordance with changes in temperature and supported by the bracket, an operating member operatively connecting said movable member with the central portion of the other frame whereby said member is actuated in response to change of temperature of the environs of the strut, spring means exerting pressure on one of said frame for maintaining the strut under tension, said strut elements including two relatively thin parallel strips of material having a relatively high temperature coefficient of expansion tied together by a diagonal bracing of thin material having a similar coefficient of expansion.

4. A thermostat comprising a strut including elements of material having relatively high temperature coefficient of expansion, two arched frames of material having relative low temperature coefficient of expansion located on opposite sides of the strut, means for attaching the ends of the frames to the ends of the strut, the central portions of the frames being more remotely spaced from the strut than their end portions, a fixed mounting bracket to which the central portion of one of the frames is attached, a movable member adapted to effect movements of a control device in accordance with changes in temperature and supported by the bracket, an operating member operatively connecting said movable member with the central portion of the other frame whereby said member is actuated in response to change of temperature of the environs of the strut, spring means exerting pressure on one of said frames for maintaining the strut under tension, said strut elements including a plurality of relatively thin, longitudinally corrugated, parallel strips of material having a relatively high temperature coefficient of expansion, the corrugations of said strips being substantially parallel as viewed in the cross section of the assembly thereof whereby a gaseous medium flowing between the strips transversely thereof is caused to take a sinuous path and a transversely corrugated spacer strip between said longitudinally corrugated strips.

References Cited in the file of this patent

UNITED STATES PATENTS

| Number | Name | Date |
|---|---|---|
| 376,644 | Farra | Jan. 17, 1888 |
| 873,511 | Cyphers | Dec. 10, 1907 |
| 1,304,635 | Watson | May 27, 1919 |
| 1,419,246 | Gee | June 13, 1922 |
| 1,983,821 | Snediker | Dec. 11, 1934 |
| 2,259,061 | Caffier | Oct. 14, 1941 |
| 2,295,876 | Taylor | Sept. 15, 1942 |
| 2,476,624 | Rabezzana | July 14, 1949 |